March 31, 1942.  E. M. SPLAINE  2,277,726
OPHTHALMIC MOUNTING
Filed Jan. 3, 1940  3 Sheets-Sheet 2
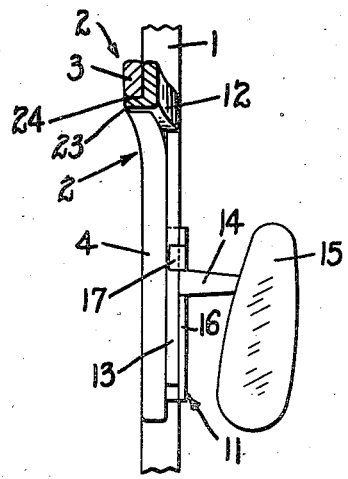
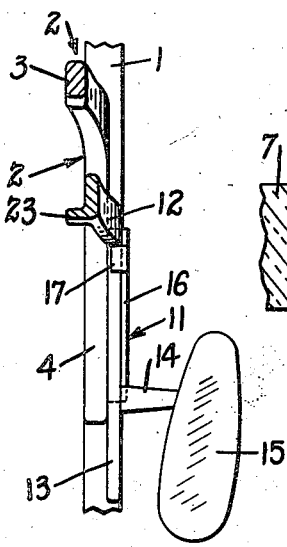
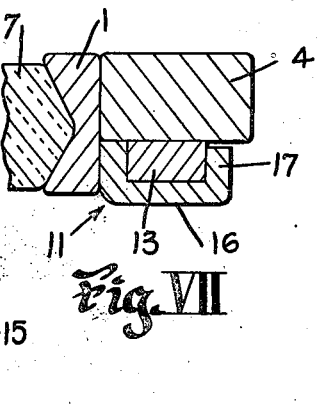
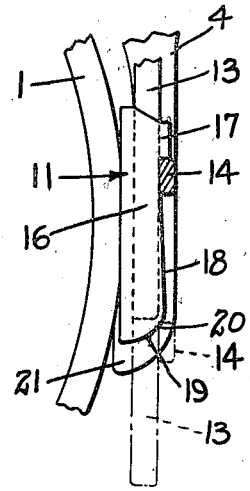
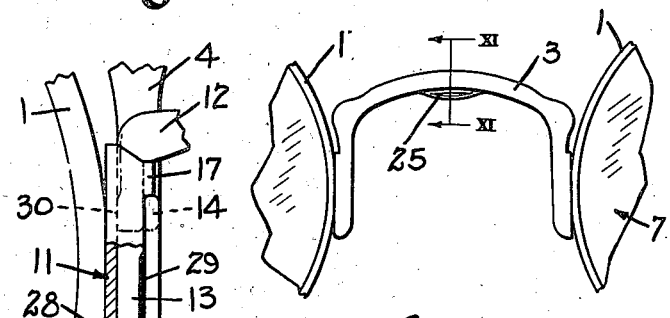
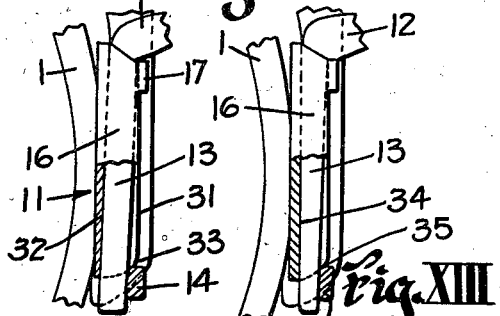
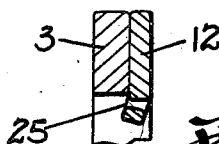
INVENTOR.
EDWARD M. SPLAINE
BY Harry H. Styll
ATTORNEY.

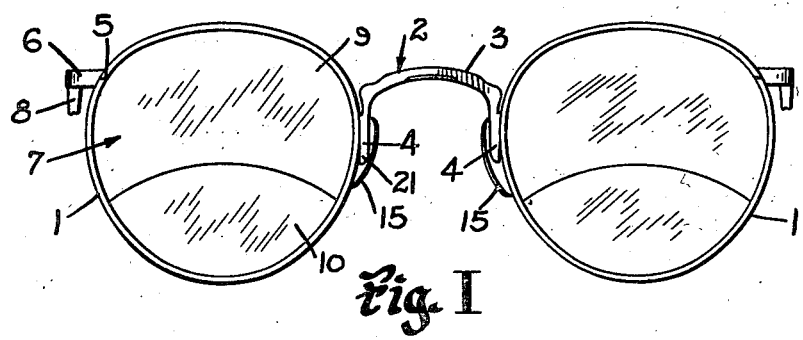
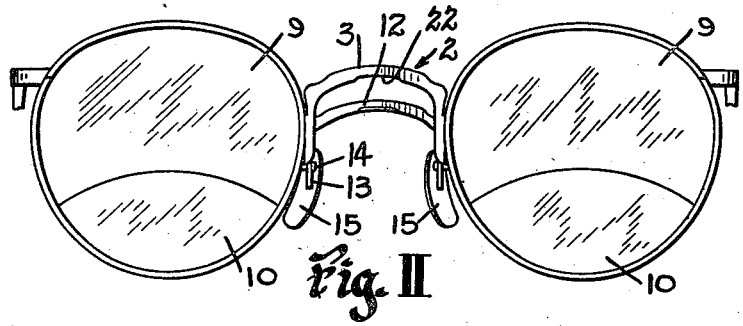
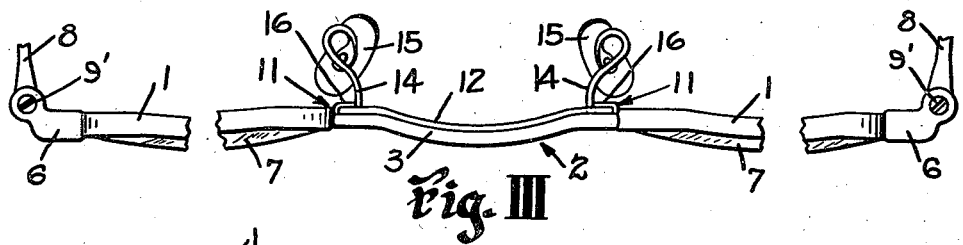
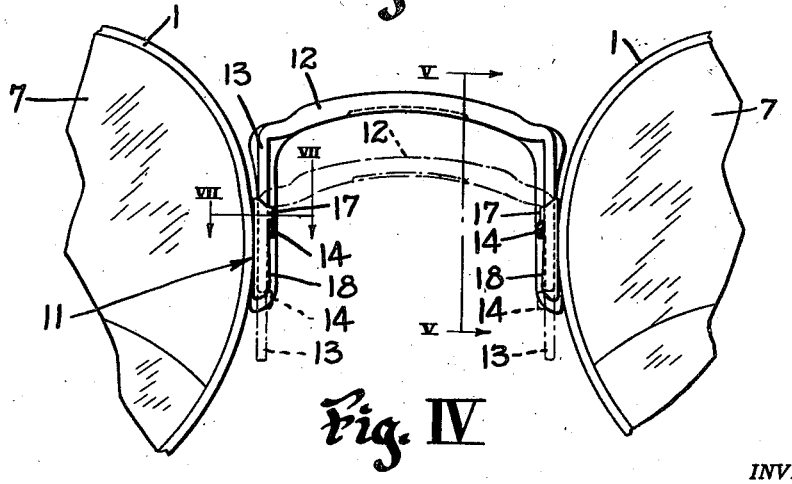

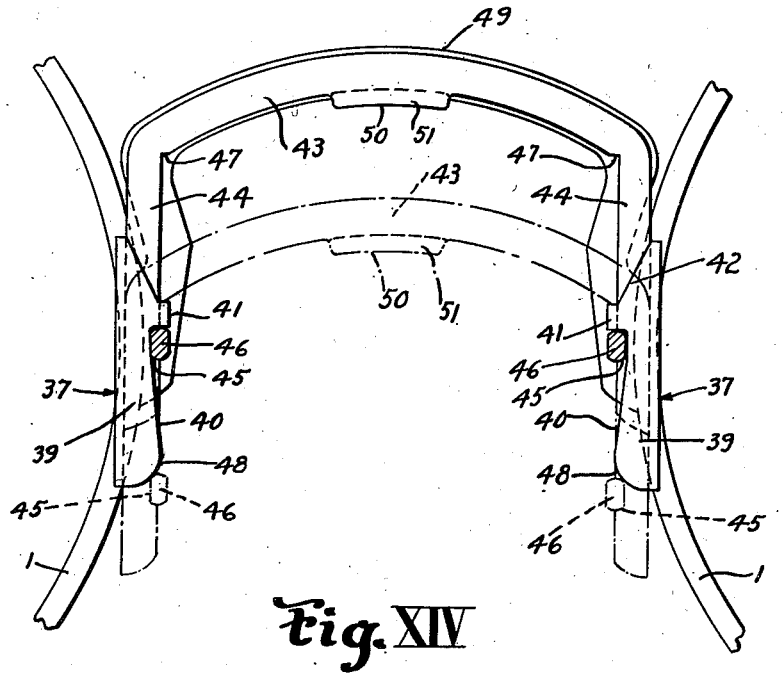
Fig. XIV
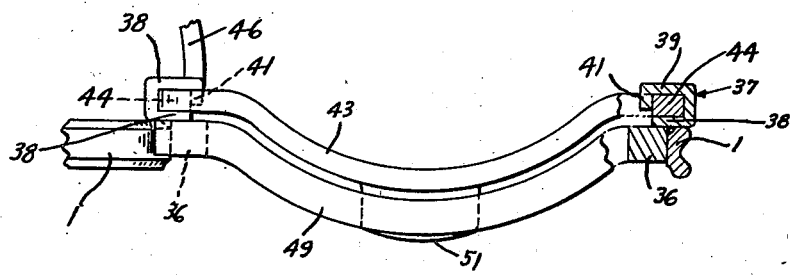
Fig. XV

Patented Mar. 31, 1942

2,277,726

UNITED STATES PATENT OFFICE 2,277,726

OPHTHALMIC MOUNTING

Edward M. Splaine, Southbridge, Mass., assignor to American Optical Company, Southbridge, Mass., a voluntary association of Massachusetts Application January 3, 1940, Serial No. 312,259

9 Claims. (Cl. 88—49)

This invention relates to improvements in ophthalmic mountings and more particularly to novel means of raising and lowering the position of the lenses before the eyes.

One of the principal objects of the invention is to provide novel means of making an ophthalmic mounting of the type for use with multifocal lenses whereby the lenses may be raised or lowered before the eyes so that when unobstructed distance vision is desired, the reading section of the lenses may be normally located below the useful field of distance vision and, when corrected reading vision is desired, the said reading sections may be raised to a normal position of use facilitating ease in reading, whereby a wide corrected and optically unobstructed field of vision may be selectively obtained through both of said fields.

Another object is to provide a construction of the above character whereby the adjustable portions of the mounting will more positively retain their adjusted positions during the use of the mounting.

Another object is to provide automatic and positive functioning means for locating and retaining the lenses at their different desired adjusted positions before the eyes.

Another object is to provide novel means of forming a rigid and durable construction of the character described and which will be self-functioning in retaining its parts in desired adjusted position.

Another object is to provide a simple, efficient and compact construction of the character described whereby the parts, under normal conditions of use, will be in relatively intimate compact relation with each other and yet afford ease and simplicity of adjustment.

Other objects and advantages of the invention will become apparent from the following description taken in connection with the accompanying drawings and it will be apparent that many changes may be made in the details of construction and arrangement of parts without departing from the spirit of the invention as expressed in the accompanying claims. I, therefore, do not wish to be limited to the exact details of construction and arrangement of parts shown and described as the preferred forms only have been given by way of illustration.

Referring to the drawings:

Fig. I is a front elevation of the mounting embodying the invention showing the parts of the mounting in normal position of use;

Fig. II is a front elevation similar to Fig. I showing the bridge adjusted for raising the reading field of the lenses into position of use;

Fig. III is a fragmentary enlarged plan view of the mounting illustrated in Figs. I and II;

Fig. IV is a fragmentary enlarged rear elevation of said mounting diagrammatically illustrating the adjustable portions thereof;

Fig. V is a sectional view taken as on line V—V of Fig. IV showing the bridge in one position of adjustment;

Fig. VI is a view generally similar to Fig. V showing the bridge in another position of adjustment;

Fig. VII is an enlarged fragmentary sectional view taken as on line VII—VII of Fig. IV;

Fig. VIII is a fragmentary rear view of the automatically functioning means for retaining the bridge in its various adjusted positions;

Fig. IX is a view generally similar to Fig. VIII of a modified form of the invention;

Fig. X is a front elevation of a slightly modified form of bridge;

Fig. XI is a fragmentary enlarged sectional view taken as on line XI—XI of Fig. X;

Fig. XII is a view generally similar to Fig. VIII illustrating another modification;

Fig. XIII is a view generally similar to Fig. XII showing a further modification;

Fig. XIV is an enlarged rear elevation similar to Fig. IV of a modified form of the invention; and Fig. XV is a plan view of the arrangement illustrated in Fig. XIV, with the mounting facing toward the front, showing a portion thereof in cross-section.

The invention is directed particularly to the provision of an ophthalmic mounting for use with multifocal lenses, that is, lenses having at least a distance focal field and a reading focal field. It has been found that in many instances it is most desirable to have the reading field of the lens normally located sufficiently low on the lens so as to not interfere with distant and intermediate vision. This, however, brought about difficulty in having the reading fields located before the eyes so that the individual using the mounting could also obtain comfortable near vision correction. In instances when the reading fields were positioned sufficiently low on the lenses as to not interfere with normal distant vision the said fields were too low to afford comfort in obtaining near vision correction as when reading. In most instances in order to remove the reading fields sufficiently from the distance fields, to avoid confusion during distant and intermediate vision, the reading fields were too low on the lenses to obtain comfort and ease in looking through said near vision fields. In most instances, the segments were so low that it required a considerable abnormal back tilting of the head to raise the segments sufficiently high so as to afford reading vision therethrough.

Many attempts have been made to provide a mounting whereby the lenses could be raised and supported on the face so that the reading fields could be brought into a comfortable position of use. With most prior art arrangements, due to the necessity of providing a mounting which is desirable from the aesthetical viewpoint, the constructions were not sufficiently rigid to avoid distortion and possible inoperativeness of the parts and in other instances would not retain their adjusted positions and yet afford ease of adjustment.

The present invention, therefore, is directed particularly to an ophthalmic mounting for use with lenses having near vision fields whereby the said fields may be raised or lowered through the provision of a bridge having adjustable nose bearing pads whereby the said pads may be quickly and easily adjusted and yet possess sufficient rigidity and durability as to maintain said adjustments during the use of the mounting.

Referring more particularly to the drawings wherein like characters of reference designate like parts throughout the several views the invention broadly embodies a pair of lens rims 1 joined by a main supporting bridge member 2. The said bridge member comprises a central arch portion 3 and depending side portions 4. The said depending side portions 4 are secured to the lens rims by soldering, welding or the like. The lens rims 1 are divided, as illustrated at 5, and are provided with conventional connecting lugs 6 which secure the lenses 7 in the rims and also afford connecting means to which suitable temples 8 may be pivotally attached, as illustrated at 9'. The lenses 7, in this particular instance, comprise a distance field 9 and a reading field 10. These lenses are commercially known as bifocal lenses but it is to be understood that the invention may be used with lenses having two or more focal fields as desired. The depending side portions 4 of the bridge and the central arch portion 3 are formed with sufficient body so as to be relatively rigid and durable when in use. The said depending side portions 4, as illustrated in Figs. III to VIII inclusive, are provided on the rear side thereof with vertical slideways 11 in substantially parallel relation with each other. Directly in the rear of the bridge 2 there is an auxiliary bridge portion 12 having depending side portions 13 slidably supported in the slideways 11. The auxiliary bridge member 12, including the depending side portions 13, is preferably formed of a relatively resilient material and the normal set of the material is such that the distance between the lower ends of the depending portions 13 is greater than the distance between the vertical slideways 11 so that when the portions 13 are fitted within and moved in said slideways, said portions 13 will tend to maintain a resilient frictional contact with said slideways. The depending portions 13 have rearwardly extending nose pad supporting arms 14 attached thereto as by soldering, welding or the like and when moved up and down in said slideways 11 are adapted to raise or lower the nose bearing pads 15 carried by the arms 14, as illustrated in Figs. I and II. In Fig. I the auxiliary bridge portion 12 is at its raised position whereby it lies directly in the rear of the main bridge portion 2 and is substantially entirely concealed from view when the mounting is viewed from the front.

In Fig. II the auxiliary bridge 12 is at its lowermost position. It is to be noted that the pads 15 are at a lower position relative to the lenses than is illustrated in Fig. I. Due to the fact that the depending side portions 13 are relatively long and are normally at a greater distance apart adjacent the lower ends thereof than are the vertical slide members 11, the said members 13 are adapted to maintain a frictional sliding contact with the slideways and provide a long bearing surface with said slideways to prevent side play therein when the auxiliary bridge is either at its high or low position. The lips 16 forming the rear bearing surfaces of the slideways 11, as shown in Figs. IV to VIII inclusive, are provided adjacent the upper ends thereof with a tongue 17 which is folded forwardly over the adjacent inner side surface of the depending portions 13. The said tongues 17 provide stop means for limiting the upward and downward movement of the auxiliary bridge 12 which carries the nose bearing pads 15. When in a raised position, as illustrated in Fig. V, the arms 14 carrying the nose bearing pads 15 engage the under side of the tongues 17 to limit the upward movement of the auxiliary bridge 12. When in the lower position the central portion of the auxiliary bridge 12 engages the upper surfaces of the tongues 17, as illustrated in Fig. VI, to limit the downward movement of the auxiliary bridge 12. The tongues 17 therefore function as stops for automatically locating the auxiliary bridge in its desired adjusted positions, both upwardly and downwardly. The lips 16, as illustrated in Figs. IV and VIII, are preferably provided with a bearing edge 18 which tapers downwardly and inwardly. These edges 18 form bearing surfaces for the rearwardly extending nose pad supporting arms 14. The said arms 14 are constantly urged into engagement with the tapered bearing surfaces 18 by the tendency of the depending portions 13 to move outwardly to their initial set. The lower extremities of the lips 16 are curved outwardly as illustrated at 19 to provide cam edges under which the nose pad supporting arms 14 will move when the auxiliary bridge 12 is adjusted to its lowest position, as illustrated by the full lines in Figs. II and VI and by the dot and dash lines in Figs. IV and VIII, particularly at points 20 adjacent the location where the curved extremities of the lips 16 blend with the downwardly and inwardly tapering edges 18. It is to be noted that when in this position the main central portion of the auxiliary bridge 12 is in engagement with the tongues or stops 17. The movement of the nose pad supporting arms 14 outwardly beneath the points 20 causes the said bearing points to function as latch means for holding the auxiliary bridge 12 in its lowermost adjusted position. The resiliency of the depending portions 13 which tend to return to their initial set constantly urge the nose pad supporting arms 14 in an outward direction and thereby tend to maintain the said arms in engagement with the bearing points 20. It is particularly pointed out that the bearing points 20 are removed outwardly from the plane of the tapered edges 18 so that when the auxiliary bridge is moved upwardly the curved contour of the lower extremities 19 of the lips 16 automatically cam the arms 14 inwardly onto the tapered edges 18 at which position the said arms will resiliently engage said edges 18 throughout their movement upward thereof to a point where the said arms engage the stops or tongues 17. It is particularly pointed out that when the arms 14 are in engagement with the stops 17, as illustrated in Fig. VIII, the portions 13 extend substantially the full length of the slideways 11 so that a long bearing surface is maintained.

By reason of the fact that the edges 18 taper upwardly and outwardly the said edges function in cooperative relation with the resiliency on the auxiliary bridge and depending portions 13 to retain the auxiliary bridge in its uppermost adjusted position. This is due to the fact that the distance between the upper portions of the tapered edges 18 is greater than the distance between the lower portions of said tapered edges so that the inherent tendency of the depending portions 13 to constantly spread apart will cause the arms 14 at their high position to engage said edges 18 and be held upwardly thereby. This is due to the fact that the arms 14 have to converge against the resilient action of the depending portions 13 in order to move downwardly of the edges 18. The tapered edges 18, therefore, function to hold the arms 14 in their uppermost adjusted position and also at their lowermost adjusted position. This is best illustrated in Figs. IV and VIII.

It is particularly pointed out, as illustrated in Fig. VIII, that the main central portion of the auxiliary bridge 12 is shaped substantially to the same shape as the central arch portion 3 of the main bridge portion 2 so that when at a high position the auxiliary bridge and main bridge constantly assume a relatively intimate fitted relation with each other. The lower ends 21 of the depending side portions 4 function to conceal the auxiliary bridge from view when the mounting is viewed from the front.

The main central arch portion 3, as illustrated in Figs. II, V and VI, is provided with a recessed under surface 22 to receive a forwardly extending tongue 23 on the auxiliary bridge 12. The tongue 23 is shaped to fit and blend with the contour of the recess 22 and the general contour of the main central arch portion 3 of the bridge, as illustrated in Fig. I. The lower front edge of the main bridge portion 3 and the upper front edge of the tongue 23 are reversely bevelled, as illustrated at 24, to provide means whereby the thumb nail may be engaged with the tongue 23 to enable the auxiliary bridge to be adjusted downwardly. Instead of this arrangement, the central portion of the auxiliary bridge might be provided with a slotted portion, as illustrated at 25 in Figs. X and XI. These arrangements are shown only by way of illustration as it is apparent that several other arrangements could be used.

In Fig. IX there is illustrated a modified form of the invention where instead of having the tapered edge 18 on the lip 16 of the slideway 11 the base of the slide is provided with a recess or pocket 26. The depending portion 13 of the auxiliary bridge is provided with a protrusion 27 adjacent the lower end thereof which is adapted to be urged inwardly of the recess or pocket 26 so as to interlock therewith when the auxiliary bridge 12 is moved to its lowermost position. This provides means functioning in cooperative relation with the outwardly urging resiliency of the depending portions 13 for retaining the auxiliary bridge 12 is in its lowermost position and thereby prevents the lenses and main bridge portion 2 from sliding down on the auxiliary bridge member during use. This is when the auxiliary bridge 12 and nose pads 15 are depressed as illustrated in Fig. II. The upper side wall 28 of the recess and protrusion 27 are tapered so as to allow the protrusion to cam outwardly of the recess when it is desired to adjust the pads and bridge member upwardly to a position such as illustrated in Fig. I. In order to provide clearance for free sliding through the stop portion 17 the depending portions 13 are cut away along the inner longitudinal edges thereof as illustrated at 29. This is to provide clearance when the protrusion 27 rides up on the upper inner surface of the base of the slide 11, as illustrated by the dash lines at 30 in Fig. IX. It is to be noted that the tongue 17 functions as a stop in a manner similar to the previously described constructions and it is also to be understood that the initial set of the resilient arms 13 is at a distance apart greater than the distance between the bases of the slideway 11 so that a constant sliding friction fit is maintained during the use of the mounting.

In Fig. XII there is illustrated a further modification which instead of having the inner edge 31 of the lip 16 tapered, as illustrated at 18 in Fig. VIII, the inner surfaces 32 of the base of the slideways 11 are bevelled in an outward and downward direction. This allows the resiliency of the depending portions 13 to urge the nose pad supporting arms 14 outwardly beneath the lower curved extremities 33 of the lips 16. When the auxiliary bridge 12 is moved upwardly the lower curved edges 33 function as cam means for camming the arms 14 inwardly so as to allow them to frictionally slide upwardly of the edges 31. The tongues 17 function as stops in the same manner as in the previously described constructions.

In Fig. XIII there is illustrated a further modification where instead of forming the inner surface of the base of the slideway 11 tapered as illustrated at 32 the depending side portions 13 are provided with a downwardly tapering edge 34. This taper functions to provide a clearance to allow the resiliency of the depending portions 13 to urge the nose pad supporting arms 14 outwardly beneath the lower curved extremities 35 of the lips 16.

As illustrated in Figs. V and VI the depending portions 13 are of a substantially uniform thickness to fit substantially snugly or relatively intimately with the side walls of the slideways 11 so that there will be substantially no looseness or play in said slideways particularly in this direction. The resiliency of the arms 13, which tend to urge said arms inwardly of the slideways, maintains a constant frictional sliding contact with said slideways so that no looseness or play exists in said direction.

During use, when it is desired to obtain an unobstructed field of vision through the distance portions 9 of the lenses, the auxiliary bridge and nose pads are in a position, such as illustrated in Fig. I, that is, are in closely fitted relation with the main bridge portion 2 of the mounting so that the auxiliary bridge and associated parts are substantially relatively inconspicuous and substantially concealed from view when the mounting is viewed from the front. When it is desired to obtain comfortable full vision through the lower reading fields 10 of the lenses the auxiliary bridge portion 12 and depending side portions 13, including the nose pads 15, are moved downwardly of the slideways 11 by insertng the thumb nail inwardly of the angled depression 24 or slot 25. This causes the supporting structure of the mounting, including the lenses to move upwardly thereby moving the reading fields 10 upwardly to a more comfortable position before the eyes. This is due to the fact that the nose bearing pads 15 assume a substantially constant fitted relation with the nose so that when the auxiliary bridge is moved downwardly of the main bridge portion 2 the lenses 7 and supporting structure of the mounting will assume an upward position relative to the eyes when on the face. When it is desired to lower the lenses it is merely necessary for the wearer to exert a slight pressure on the top of the arch portion 3 of the main bridge portion 2 only sufficiently to cause the arms 14 to be cammed inwardly by the curved extremities of the lips 16 whereby the said arms will frictionally slide upwardly of the edges 18 to a position where they will engage the stop members 17. The length of the slideways 11 and associated parts of course are controlled according to the amount of movement required to bring the reading and distance fields to the desired position before the eyes.

In Figs. XIV and XV there is illustrated another modified form of the invention generally similar to the construction illustrated in Fig. IV. In this instance, however, the lens rims 1 or lens holding means are secured to the depending side portions 36 with the rear edge surfaces thereof in flush relation with the rear surfaces of said depending side portions. The spaced vertical slideways 37 are formed to a U-shape cross-section with a side wall 38 thereof secured to the rear flush surfaces of the lens rims or lens holding means 1 and the depending side portions 36 of the bridge, see Fig. XV. With this arrangement, the depending side portions 36 may be formed much narrower in width than the depending side portions 4 of the bridge illustrated in Figs. I to IV inclusive. The outer side walls 39 of the U-shaped slideways 37 have an inwardly tapering edge 40 simulating the edge 18 of the slideways illustrated in Fig. IV. The side walls 39 have a tongue 41 which is bent inwardly to provide stop members simulating the stop members 17. The said side walls 38 and 39 extend upwardly of the stop members 41, as illustrated at 42, to provide an increased bearing surface above said stop members. An auxiliary bridge 43 simulating the auxiliary bridge 12 and having depending side portions 44 is slidably mounted in the slideways 37. When the depending side portions 44 are in assembled relation with the slideways 37 the resiliency of the said depending side portions will normally tend to urge said depending side portions in a direction inwardly and in friction contact with the bottom of said slideways. The said depending portions 44 are each provided with a notched seat 45 to which is soldered a nose pad supporting arm 46 simulating the nose pad supporting arms 14. The notches 45 are provided for ease in assembly during the manufacture of the mounting and function as position locating means at which the said arms 46 are to be soldered to the depending side portions 44. This is extremely important as the location of the arms on the depending portions 44 must be carefully controlled as will be set forth hereinafter. It is particularly pointed out that the auxiliary bridge is provided with stop faces 47 which are adapted to engage the top surfaces of the stop members 41. When in this position the nose pad supporting arms 46 are so located on the depending side portions 44 as to ride beneath the curved cam like ends 48 of the side walls 39. The tendency of the resilient depending side portions 44 to be constantly urged in a direction away from each other causes the said nose pad supporting arms 46 to ride beneath the cam-like ends 48. This tends to hold the auxiliary bridge in its lowermost adjusted position. When it is desired to raise the bridge the thumb and finger of the operator are engaged with the top of the main bridge member 49 and the under surface 50 of the auxiliary bridge 43. By pressing the thumb and finger toward each other the nose pad supporting arms 46 will cam inwardly about the edges 48 onto the tapered edge surfaces 40 of the side walls 39. Continued movement in an upward direction causes the said nose pad supporting arms 46 to engage the stop members 41. When at this position the tapered edges 40 functioning in cooperative relation with the outwardly urging tendency of the depending side portions 44 tend to maintain the auxiliary bridge 43 in intimate superimposed relation with the main bridge member 49 as illustrated in full lines in Fig. XIV. The inwardly tapering of the edges 40, as the said edges progress downwardly, tend to prevent the auxiliary bridge from being free to ride downwardly of the slideways 37. The tapering edges 40 and the outwardly urging tendency of the depending portions 44 function to retain the auxiliary bridge in its most upward adjusted position and said outwardly urging tendency of the depending portions 44 function cooperatively with the cam like ends 48 when the auxiliary bridge 43 is adjusted to the lowermost position to retain it in its adjusted position. The auxiliary bridge member 43 is provided with a lip 51 which has an edge protruding beneath the main bridge 49 which provides means whereby the auxiliary bridge may be engaged and moved to its lowermost position when on the face.

The distance of the nose pad supporting arms 46 from the stop surfaces 47 must be controlled, as stated above, in order to insure that the said arms 46 will ride beneath the cam ends 48 when the said stop surfaces 47 engage the stop members 41.

The preformed notches 45 therefore in the depending portions 44 function as means for automatically locating the nose pad supporting arms at the desired position on the depending portions. It is merely necessary to fit the arms 46 in said notched portions and to solder or otherwise secure the depending arms to the said portions at this location. When the parts are in assembled relation with each other the slides 37 and auxiliary bridge member 43 will lie at the rear of the central arch portion and depending side portions of the main bridge 49 as illustrated in Figs. XIV and XV and will be invisible when the mounting is viewed from the front.

Although applicant has shown and described an ophthalmic mounting of the type having lens rims 1 surrounding the lenses it is to be understood that the bridge may be connected with a suitable rimless lens strap of a commonly known commercial type to which the lenses are in turn secured. As far as the adjustable bridge embodying the invention is concerned, it will work equally as well with a rim or rimless type mounting. The particular advantage of the present arrangement, including the modifications, is that the auxiliary bridge and associated nose pads will retain the positions to which they are adjusted and will not move out of said adjusted positions during use. This is due to the fact that there is a constant resilient frictional relation between the slideways and the associated parts of the mounting at all positions of adjustment and that means are provided particularly at the extreme desired positions of adjustment cooperatively functioning with the inherent resiliency of the bridge for retaining the parts in said adjusted position.

Another advantage of applicant's invention is that while the invention provides means for substantially positively retaining the parts in adjusted position, said parts may be quickly and easily adjusted and will compensate for wear which might result from the use of the device over a considerable period of time.

One of the advantages of applicant's invention over most prior art constructions of this type is that the mounting may be handled without danger of having the adjustable parts move out of adjusted position, that is, by possible working of the bridge through handling. Although applicant has illustrated a few modifications by which his desired results may be obtained, it is to be understood that several other modifications might be worked out embodying the general principles of the invention. The gist of applicant's invention is to provide an adjustable bridge for raising and lowering the lenses before the eyes. The said bridge has intersliding parts which maintain a constant sliding frictional relation with each other with means for controlling the different desired positions of adjustment while maintaining the parts in rigid durable relation with each other at different adjusted positions in combination with means cooperatively functioning with the frictional resilient relation of the parts for positively retaining the parts at different adjusted positions and which will yet enable the adjustments to be made with a relative ease and with a smoothness of operation which insures against resistance to adjustments and looseness and play between the parts at different adjusted positions.

Another outstanding feature of the invention is the simplicity of construction rendering the device relatively easy and inexpensive to manufacture and one which is desirable from the aesthetical viewpoint.

The desired results are obtained by making the main bridge member sufficiently rigid to positively support the lenses in desired aligned spaced relation with each other and by providing vertical slides in the rear of the bridge at a substantially parallel given spaced relation with each other and to provide an auxiliary bridge having depending side portions which are of a resilient nature with the initial set of said resilient depending portions such that the said depending portions will be disposed at an inclination with respect to each other when not under tension in the slideways such that the said depending portions must be drawn together against the reaction of the resiliency thereof when being fitted in and assembled with the vertical slideways and to provide means for holding said depending side portions of the auxiliary bridge in said slideways with the said means functioning as a stop for limiting and controlling the main positions of adjustments of said auxiliary bridge relative to the main bridge portion in combination with means cooperatively functioning with the resiliency of said auxiliary bridge to positively retain the parts at different adjusted positions.

From the foregoing description it will be seen that simple, efficient and economical means have been provided for accomplishing all of the objects and advantages of the invention.

Having described my invention, I claim:

1. In a device of the character described a main bridge member having spaced vertical slideways with cam edges converging toward each other adjacent one of the ends of said slideways and having stop means adjacent the opposite ends thereof, an auxiliary bridge having portions slidably mounted in said slideways and having rearwardly extending nose pad supporting arms thereon, said portions slidably mounted in said slideways having an initial set relative to each other greater than the distance between the slideways and for constantly urging the nose pad supporting arms into engagement with the cam edges, said auxiliary bridge and nose pad supporting arms being adjustable longitudinally of the slideways, said stop means limiting said adjustment at different predetermined positions.

2. In a device of the character described a main bridge member having spaced vertical slideways with cam edges converging toward each other adjacent one of the ends of said slideways and having stop means adjacent the opposite ends thereof, an auxiliary bridge having portions slidably mounted in said slideways and having rearwardly extending nose pad supporting arms thereon, said portions slidably mounted in said slideways having an initial set relative to each other greater than the distance between the slideways and for constantly urging the nose pad supporting arms into engagement with the cam edges, said auxiliary bridge and nose pad supporting arms being adjustable longitudinally of the slideways, said stop means limiting said adjustment at different predetermined positions, said means being such that when the auxiliary bridge is depressed and is in engagement with the means for limiting said adjustment the said nose pad supporting arms will be located adjacent the lower extremities of the cam surfaces.

3. In a device of the character described the combination of a bridge member having depending side portions, vertically extending slideways and stop means located in the rear of said depending side portions, said vertically extending slides having cam edges and an auxiliary bridge having portions slidably mounted in said slideways and having nose pad supporting portions yieldingly engaging said cam edges, said stop means limiting the adjustment of said auxiliary bridge in said slideways at different predetermined positions.

4. In a device of the character described the combination of a bridge member having depending side portions, vertically extending slideways located in the rear of said depending side portions, said vertically extending slides having cam edges and an auxiliary bridge having portions slidably mounted in said slideways and having nose pad supporting portions adapted to engage said cam edges, said slideways having stop means and said depending portions of said auxiliary bridge member being resilient and arranged to constantly urge the nose pad supporting arms towards said cam edges.

5. An ophthalmic mounting comprising a pair of lenses, lens holding means on said lenses, a main bridge member having spaced vertical slideways with cam edges converging toward each other adjacent one of the ends of said slideways and having stop means adjacent the opposite ends thereof, an auxiliary bridge having portions slidably mounted in said slideways and having rearwardly extending nose pad supporting arms thereon, said portions slidably mounted in said slideways having an initial set relative to each other greater than the distance between the slideways and for constantly urging the nose pad supporting arms into engagement with the cam edges, said auxiliary bridge and nose pad supporting arms being adjustable longitudinally of the slideways, said stop means limiting said adjustment at different predetermined positions.

6. An ophthalmic mounting comprising a pair of lenses, lens holding means on said lenses, a main bridge member having spaced vertical slideways with cam edges converging toward each other adjacent one of the ends of said slideways and having stop means adjacent the opposite ends thereof, an auxiliary bridge having portions slidably mounted in said slideways and having rearwardly extending nose pad supporting arms thereon, said portions slidably mounted in said slideways having an initial set relative to each other greater than the distance between the slideways and for constantly urging the nose pad supporting arms into engagement with the cam edges, said auxiliary bridge and nose pad supporting arms being adjustable longitudinally of the slideways, said stop means limiting said adjustment at different predetermined positions, said means being such that when the auxiliary bridge is depressed and is in engagement with the means for limiting said adjustment the said nose pad supporting arms will be located adjacent the lower extremities of the cam surfaces.

7. An ophthalmic mounting comprising a pair of lenses, lens holding means on said lenses, a main bridge member having depending side portions, vertically extending slideways located in the rear of said depending side portions, said vertically extending slides having cam edges and an auxiliary bridge having portions slidably mounted in said slideways and having nose pad supporting portions adapted to engage said cam edges, said slideways having stop means and said depending portions of said auxiliary bridge member being resilient and arranged to constantly urge the nose pad supporting arms towards said cam edges.

8. In a device of the character described a main bridge member having depending side portions with longitudinally disposed slideways, said slideways each having a bearing surface with a cam portion within the limits of said slideways, an auxiliary bridge assembly comprising depending portions slidably mounted in said slideways and nose pad supporting means on said depending portions, at least a portion of said auxiliary bridge assembly having an inherent resiliency with an initial set which is such that the normal distance between the free ends of the depending portions of said auxiliary bridge assembly is greater than the distance between the bearing surfaces of the slideways whereby said depending portions, when assembled with said slideways, will be under a tension causing them to be resiliently urged in the direction of the bearing surfaces of the slideways, said assembly, through said inherent resiliency, having parts thereof adapted to be resiliently urged into engagement with the respective cam portions in one position of adjustment, and said depending side portions with longitudinally disposed slideways having stop means adapted to be engaged by portions of said auxiliary bridge assembly, during the adjustment thereof, to limit the different positions of adjustment.

9. An ophthalmic mounting comprising a pair of lenses, lens holding means on said lenses, a main bridge member having depending side portions with longitudinally disposed slideways, said slideways each having a bearing surface with a cam portion within the limits of said slideways, an auxiliary bridge assembly comprising depending portions slidably mounted in said slideways and nose pad supporting means on said depending portions, at least a portion of said auxiliary bridge assembly having an inherent resiliency with an initial set which is such that the normal distance between the free ends of the depending portions of said auxiliary bridge assembly is greater than the distance between the bearing surfaces of the slideways whereby said depending portions, when assembled with said slideways, will be under a tension causing them to be resiliently urged in the direction of the bearing surfaces of the slideways, said assembly, through said inherent resiliency, having parts thereof adapted to be resiliently urged into engagement with the respective cam portions in one position of adjustment, and said depending side portions with longitudinally disposed slideways having stop means adapted to be engaged by portions of said auxiliary bridge assembly, during the adjustment therof, to limit the different positions of adjustment.

EDWARD M. SPLAINE.